(12) United States Patent
Shibasaki

(10) Patent No.: US 6,317,585 B1
(45) Date of Patent: Nov. 13, 2001

(54) MOBILE SATELLITE COMMUNICATION SYSTEM WITH QUICK RETRANSMISSION DETERMINATION FUNCTION

(75) Inventor: Kazunori Shibasaki, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/247,562

(22) Filed: Feb. 10, 1999

(30) Foreign Application Priority Data

Feb. 23, 1998 (JP) .................................................. 10-040726

(51) Int. Cl.[7] ...................................................... H04B 7/19
(52) U.S. Cl. ........................ 455/13.2; 455/427; 455/12.1
(58) Field of Search .................... 455/12.1, 13.1, 455/427, 13.2, 98, 422; 342/357.02, 358, 357.03; 370/316, 315, 324

(56) References Cited

U.S. PATENT DOCUMENTS

| | | | |
|---|---|---|---|
| 5,274,841 | * 12/1993 | Natarajan et al. | 370/337 |
| 5,659,545 | * 8/1997 | Sowles et al. | 370/324 |
| 5,694,334 | * 12/1997 | Donahue et al. | 709/247 |
| 5,742,639 | * 4/1998 | Fasulo, II et al. | 375/219 |
| 5,758,261 | * 5/1998 | Wiedeman | 455/13.1 |
| 5,875,182 | * 2/1999 | Hatzipapafotiou | 370/321 |
| 6,044,277 | * 3/2000 | Tsuda | 455/522 |

FOREIGN PATENT DOCUMENTS

| | | |
|---|---|---|
| 62-224131 | 10/1987 | (JP) . |
| 63-86621 | 4/1988 | (JP) . |
| 63-217832 | 9/1988 | (JP) . |
| 64-24522 | 1/1989 | (JP) . |
| 64-24641 | 1/1989 | (JP) . |
| 4-135330 | 5/1992 | (JP) . |
| 5-63671 | 3/1993 | (JP) . |

* cited by examiner

Primary Examiner—Nay Maung
Assistant Examiner—Sonny Trinh
(74) Attorney, Agent, or Firm—Foley & Lardenr

(57) ABSTRACT

A mobile satellite communication system includes a base station apparatus, and a plurality of mobile terminals coupled to the base station apparatus through an artificial satellite. Also, there are a forward link from the base station apparatus to the plurality of mobile terminals, and a return link from the plurality of mobile terminals to the base station apparatus. The base station apparatus transmits an access control signal to one of the plurality of mobile terminals through the forward link. The mobile terminal determines whether a correct reception indication data or an incorrect reception indication data is contained in the access control signal, and performs retransmission of the short burst transmission when it is determined that the incorrect reception indication data is contained in the access control signal.

20 Claims, 8 Drawing Sheets

ACCESS CONTROL SIGNAL AC

I/B FLAG
 1: TRANSMISSION ENABLE(I)
 0: TRANSMISSION DISABLE(B)

BASE STATION → MOBILE STATION (FORWARD LINK)

SYNC PATTERN → BASE STATION (RETURN LINK)

ACCESS CONTROL SIGNAL AC

I/B  1: TRANSMISSION ENABLE (I)
     0: TRANSMISSION DISABLE (B)

O/C  1: LONG BURST RESERVATION ENABLE (O)
     0: LONG BURST RESERVATION DISABLE (C)

O/N  1: SHORT BURST RECEPTION (OK)
     0: SHORT BURST NON-RECEPTION (NG)

MOBILE SATELLITE COMMUNICATION SYSTEM WITH QUICK RETRANSMISSION DETERMINATION FUNCTION

BACKGROUND OF THE INVENTION

1. Field of the Invention

The present invention relates to a mobile satellite communication system, and more particularly a mobile satellite communication system for performing communication between a mobile terminal and a base station apparatus by use of a communication system of utilizing a randomly access control system and a reserving system.

2. Description of the Related Art

A communication system which utilizes a randomly access control system and a reserving system described below is well known as a communication system in a mobile satellite communication system for performing a communication between a mobile terminal and a base station apparatus through a satellite.

In such a mobile satellite communication system, a plurality of mobile terminals perform a short burst transmission having a long guard bit pattern to the base station apparatus through a return link. The return link is a communication channel used for the transmission from the plurality of mobile terminals to the base station apparatus. For this reason, there may be a possibility that competition for the utilization of the return link occurs between the respective mobile terminals. Therefore, an access control signal AC is transmitted from the base station apparatus to the mobile terminals through a forward link so that the competition relation can be arbitrated. Such a forward link is a communication link used for a transmission from the base station apparatus to the respective mobile terminals.

FIG. 1 shows a structure of the access control signal AC. In FIG. 1, the access control signal AC has the field of a 1-bit I/B (Idle/Busy) flag, the field of a 16-bit partial echo signal (hereafter, to be referred to as a PE signal), the field of a 8-bit time alignment correction value TA, and the field of 8-bit CRC code. The I/B flag is set to "1" when the transmission using the return link is possible, i.e., the return link is in an idle state (I). On the other hand, the I/B flag is set to "0" when the transmission using the return link is impossible, i.e., when the return link is in a busy state (B).

The partial echo signal includes the information to specify one of the mobile terminals, from which reservation for a long burst transmission to be described later using the return link is transmitted to the base station apparatus.

The time alignment correction value TA is the information to specify a transmission timing of the long burst transmission.

The CRC code is a code added to carry out error detection and correction of the above-mentioned I/B flag, PE signal and time alignment correction value TA.

The above-mentioned access control signal AC is always transmitted from the base station apparatus to the respective mobile terminals through the forward link. Each mobile terminal always monitors the access control signal AC transmitted through this forward link. The mobile terminal performs a short burst transmission only when the I/B flag is set to "1" of the transmission permission state. At the same time, the mobile terminal starts a clocking operation of a timer.

Upon reception of this short burst transmission, the base station apparatus transmits to the mobile terminals, the access control signal AC including a response to the short burst transmission. Thus, the short burst transmission from the mobile terminal to the base station apparatus is ended. If the transmission from the mobile terminal to the base station apparatus is completed in the short burst transmission, the transmission from the mobile terminal to the base station apparatus is ended at this time.

When the I/B flag of the access control signal AC is set to "1", i.e., the transmission permission state, the short burst transmissions may be often performed by the plurality of mobile terminals at the same time. In this case, the receiving operation is performed in the base station apparatus, in a condition that short burst transmissions from the plurality of mobile terminals collide with each other. As a result, an error is detected in a CRC check operation to the received short burst transmissions. In such a case, the base station apparatus regards that the short burst transmissions are not received from any mobile terminal. At this time, the mobile terminal measures time by the timer after the short burst transmission. If this timer is set to the state of time-out without any reception of an access control signal including the PE signal from the base station apparatus after the short burst transmission, the mobile terminal determines that the short burst transmission fails, and again tries the short burst transmission.

The above-mentioned description gives the communication between the mobile terminal and the base station apparatus, when the data transmitted from the mobile terminal to the base station apparatus can be accommodated in the single short burst transmission.

On the contrary, there may be a case in which the transmission data from the mobile terminal to the base station apparatus is long so that the transmission data cannot be accommodated in the single short burst transmission. In this case, the base station apparatus makes a reservation such that the mobile terminal, which has performed the short burst transmission can use the return link for transmission of the subsequent data. Then, the base station apparatus transmits the access control signal AC including the time alignment correction value TA for specifying a transmission timing and the PE signal including a specification data identifying the mobile terminal corresponding to the reservation, to the mobile terminal through the forward link. Upon reception of this access control signal AC, the corresponding mobile terminal performs a long burst transmission including the whole or a part of the subsequent data through the return link, at the transmission timing specified based on the time alignment correction value TA.

The above-mentioned description gives the communication from the mobile terminal to the base station apparatus by use of the reserving system.

In the above-mentioned conventional mobile satellite communication system, the mobile terminal can know the failure of the short burst transmission at a time point when the timer started at the short burst transmission is set to the time-out state. That is, the mobile terminal can know the failure of the short burst transmission only after elapse of a predetermined time from the short burst transmission. Thus, the recognition as to whether or not the short burst transmission has been successful is different between the mobile terminal and the base station apparatus. As a result, there is a problem that there is a case that the communication is not correctly performed.

In addition to the above conventional mobile satellite communication system, a line setting request call originating system in a satellite communication system is described in Japanese Laid Open patent Application (JP-A-Showa 63-86621). In this reference, base stations are grouped into a plurality of groups. Each group includes two or more base stations. Also, one frame on a common channel, on which a line allocate request is transmitted, is composed of a plurality of integration time slots respectively corresponding to the plurality of groups. Each integration time slot is divided into a plurality of small time slots. A call originating operation is performed to the integration time slot in units of groups by use of a TDMA system. A call originating operation is performed to the small time slots of the integration time slot corresponding to one group in units of base stations of the group by use of a random access system with slot.

Also, a control signal sending system is described in Japanese Laid Open patent Application (JP-A-Showa 64-24522). In this reference, a control LSI (1) of a satellite communication TDMA apparatus has a burst counter (8) and performs the control of sending a control signal by performing a process in units of bursts. The control LSI also has a basic frame counter (6) for counting basic TDMA frames and a buffer (2) holding the control signal. The control LSI accesses an upper bit portion of the buffer (2) based on the output of the basic frame counter (6) and a lower bit portion of the buffer (2) based on the output of the burst counter (8). Thus, the control signal held in the buffer (2) is sent the number of times corresponding to the number of transponders for every basic frame.

Also, a satellite communication system is described in Japanese Laid Open patent Application (JP-A-Showa 64-24641). In this reference, the satellite communication system is composed of a main station and a plurality of child stations. A common carrier wave is used for transmissions from the child stations to the main station. In this system, a random access system is adopted in which each child stations sends a signal in units of slots obtained by partitioning the carrier wave on a time axis. A single carrier wave is used for transmission from the main station to the child stations. A signal is sent to each child station in a time divisional manner by use of a TDM channel. A frame on a random access channel is produced using a frame sync signal sent on the TDM channel and divided into a plurality of slots in order. When data are to be collected from n child stations, a control is performed such that specific ones of the n child stations send data on predetermined slots and such that remaining ones of the n child stations other than the specific child stations do not send data on the predetermined slots. This control is performed to different child stations in order in accordance with necessity.

Also, a satellite communication system is described in Japanese Laid Open patent Application (JP-A-Heisei 4-135330). In this reference, the satellite communication system is composed of a center station and a plurality of peripheral stations, each of which has a transmission section for accessing the center station through a satellite and a common channel. In this system, therefore, propagation times from the respective peripheral station to the satellite are different from each other. Each of the peripheral station is composed of a frame synchronizing section for extracting a reference timing signal from a transmission signal arriving from the center station, and a transmission timing control section for generating a transmission timing signal based on a time slot designating signal and for sending the transmission timing signal to the transmission section. The transmission timing signal is used to control a transmission timing of its transmission signal synchronous with the reference timing signal on the basis of a unit of a plurality of symbols.

Also, a satellite communication system is described in Japanese Laid Open patent Application (JP-A-Heisei 5-63671). In this reference, a plurality of peripheral stations is grouped into groups in unit of predetermined number of peripheral stations. A center station C allocates a time slot in units of groups. Mini-slots are provided for the time slot accessed by the peripheral stations. The mini-slot is fixedly allocated to each peripheral station. It is supposed to be two groups. Peripheral stations a, b and c belong to a group 1. The peripheral stations a and b transmit data A1 and b1 on the third time slot of the first frame 1 and signals to the mini-slots allocated to them. The center station C monitors the mini-slots. The center station C determines that collision occurs, since the two mini-slots are used in the third time slot of the first frame 1. As a result, the center station C allocates retransmission slots to the peripheral stations a and b and a random access slot to the peripheral station c to the first, third and fifth time slots of the third frame 3. Thus, the retransmissions of the data A1' and B1' from the peripheral stations a and b is successful in a single cycle. Also, the peripheral station c can transmit data C1 without collision with the retransmitted data A1' and B1'.

SUMMARY OF THE INVENTION

The present invention is accomplished to solve the above-mentioned problems. Therefore, an object of the present invention is to provide a mobile satellite communication system, in which a mobile terminal can know success or failure of a short burst transmission accurately and quickly.

Another object of the present invention is to provide a mobile satellite communication system, in which if a mobile terminal can know success or failure of reservation accurately and quickly, when the reservation for a long burst transmission is made to a base station apparatus by using a short burst transmission.

In order to achieve an aspect of the present invention, a mobile satellite communication system includes a base station apparatus, and a plurality of mobile terminals coupled to the base station apparatus through an artificial satellite. Also, there are a forward link from the base station apparatus to the plurality of mobile terminals, and a return link from the plurality of mobile terminals to the base station apparatus. The base station apparatus transmits an access control signal to one of the plurality of mobile terminals through the forward link. The mobile terminal determines whether a correct reception indication data or an incorrect reception indication data is contained in the access control signal, and performs retransmission of the short burst transmission when it is determined that the incorrect reception indication data is contained in the access control signal.

The base station apparatus determines whether the short burst transmission is correctly received, and sets the correct reception indication data in the access control signal when it is determined that the short burst transmission is correctly received, and sets the incorrect reception indication data in the access control signal when it is determined that the short burst transmission is not correctly received.

The mobile terminal performs retransmission of the short burst transmission after a delay time when it is determined that the incorrect reception indication data is contained in the access control signal. The delay time is randomly determined.

The short burst transmission includes a request data indicating that a data which cannot be transmitted by the short burst transmission is transmitted. In this case, the mobile terminal determines whether a reservation permission data is contained in the access control data, and perform a long burst transmission for the data when it is determined that the reservation permission data is contained in the access control data. Also, the mobile terminal determines whether a mobile terminal for the reservation permission data is the mobile terminal, when it is determined that the reservation permission data is contained in the access control data, and perform the long burst transmission for the data when it is determined that the mobile terminal for the reservation permission data is the mobile terminal.

In addition, the base station apparatus determines whether a reservation of a long burst transmission using the return link is to be permitted or rejected, in response to the request data, and sets a reservation permission data in the access control signal when it is determined that the reservation of the long burst transmission using the return link is permitted, and a reservation rejection data in the access control signal when it is determined that the reservation of the long burst transmission using the return link is rejected. In this case, the mobile terminal performs retransmission of the short burst transmission when it is determined that the reservation rejection data is contained in the access control signal.

In order to achieve another aspect of the present invention, a base station apparatus in a mobile satellite communication system in which an access control signal is transmitted from the base station apparatus to a plurality of a plurality of mobile terminals through an artificial satellite and a forward link from the base station apparatus to the plurality of mobile terminals, includes a determining section for determining whether the short burst transmission is correctly received, and a setting section for setting the correct reception indication data in the access control signal when it is determined that the short burst transmission is correctly received, and setting the incorrect reception indication data in the access control signal when it is determined that the short burst transmission is not correctly received.

In order to achieve still another aspect of the present invention, a mobile terminal in a satellite communication system in which the mobile terminal is coupled to a base station apparatus through an artificial satellite and a forward link from the base station apparatus to the mobile terminal, and a return link from the mobile terminal to the base station apparatus, includes a determining section for determining whether a correct reception indication data or an incorrect reception indication data is contained in the access control signal, and a transmission section for performing retransmission of the short burst transmission when it is determined that the incorrect reception indication data is contained in the access control signal.

In order to achieve yet still another aspect of the present invention, a method of communicating between a base station apparatus and a plurality of mobile terminals in a mobile satellite communication system, includes the steps of:

transmitting an access control signal to one of the plurality of mobile terminals through a forward link;

determining whether a correct reception indication data or an incorrect reception indication data is contained in the access control signal; and performing retransmission of the short burst transmission when it is determined that the incorrect reception indication data is contained in the access control signal.

DESCRIPTION OF THE PREFERRED EMBODIMENTS

A mobile satellite communication system of the present invention will be described below in detail with reference to the attached drawings.

Figure 2:
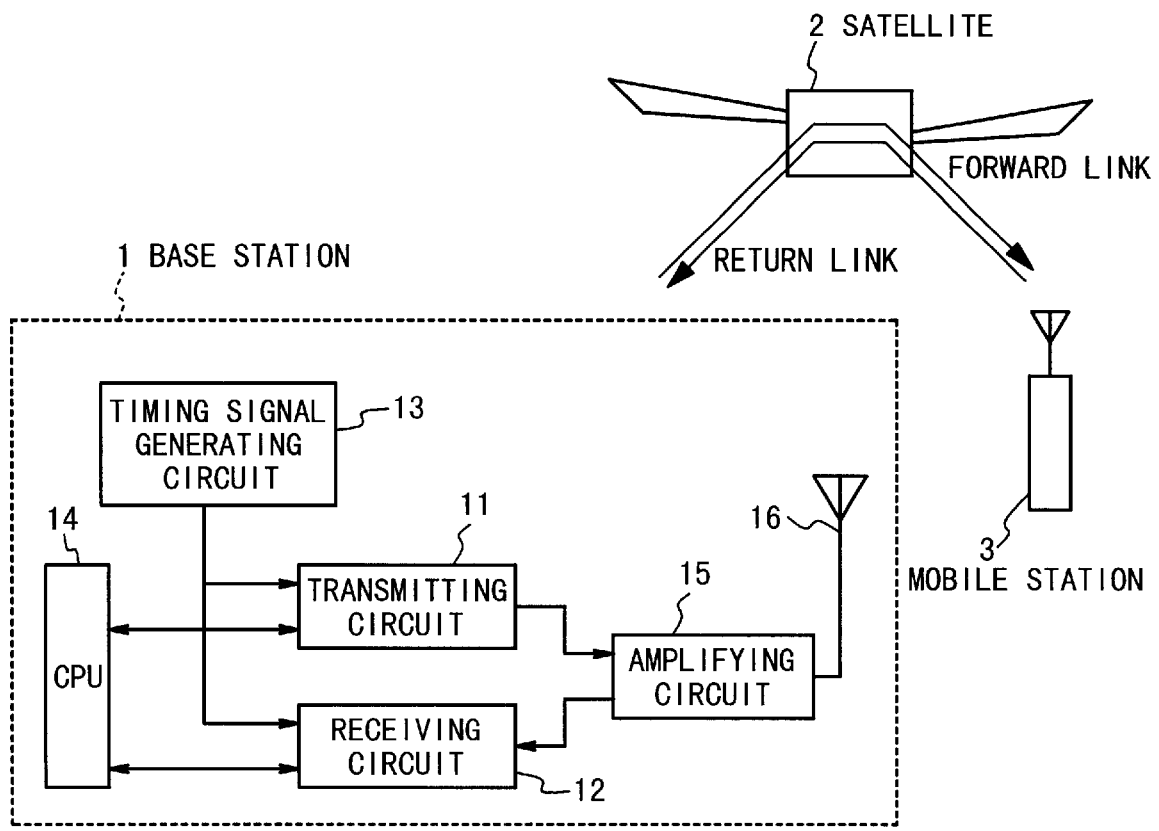
FIG. 2 is a block diagram illustrating the structure of a mobile communication system according to an embodiment of the present invention.

FIG. 2 is a block diagram illustrating the structure of the mobile satellite communication system according to an embodiment of the present invention. As shown in FIG. 2, the mobile satellite communication system is composed of a base station apparatus 1, a satellite 2 and a mobile terminal 3.

The base station 1 is composed of a transmitting circuit 11, a receiving circuit 12, a timing signal generating circuit 13, a CPU 14, an amplifying circuit 15, and an antenna 16. The transmitting circuit 11 assembles a signal to be transmitted to the mobile terminal 3 and then modulates the signal to have a format suitable for a radio communication. The receiving circuit 12 demodulates a signal in the radio communication from the mobile terminal 3 and then disassembles the signal to extract a data. The timing signal generating circuit 13 generates timing signals necessary for the modulation and the demodulation in the transmitting circuit and the receiving circuit, and timing signals necessary for the transmission and the reception on the radio transmission. The CPU 14 controls the transmitting circuit 11 and the receiving circuit 12. The amplifying circuit 15 amplifies the signals so that the transmitting circuit 11 and the receiving circuit 12 can perform the radio communication. The antenna 16 transmits and receives the signals for the wireless communication.

Figure 3A:
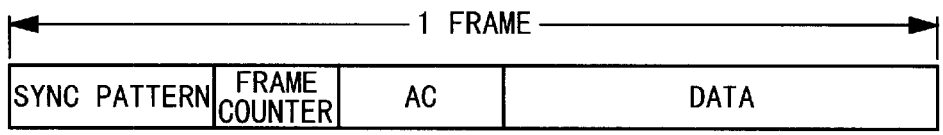
FIG. 3A is a diagram showing the structure of data on a forward link which is transmitted from a base station apparatus to a mobile terminal in the embodiment.
Figure 4:
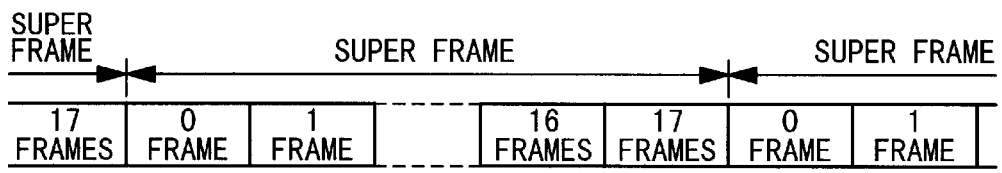
FIG. 4 is a time chart showing frames and super frames used in the embodiment.

FIG. 3A shows the format of a signal transmitted from the base station apparatus 1 to the mobile terminal 3 through a forward link. The forward link is dedicatedly allocated to the base station apparatus. The signal structure is composed of a synchronization pattern, a frame counter, an access control signal AC and a data. The structure shown in FIG. 2A is defined as one frame. One super frame is composed of 18 frames, as shown in FIG. 4. In the mobile satellite communication system shown in FIG. 2, this super frame is repeatedly transmitted from the base station apparatus 1 to the mobile terminal 3.

Figure 3B:
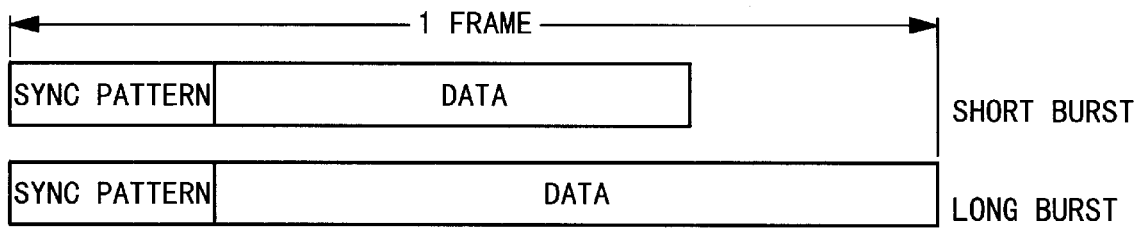
FIG. 3B is diagrams illustrating the structures of short burst transmission and long burst transmission on a return link which are transmitted from the mobile terminal to the base station apparatus in the embodiment.

On the other hand, FIG. 3B shows the structures of signals transmitted from the mobile terminal 3 to the base station apparatus 1 through a return link. The return link is provided in common to a plurality of mobile terminals. In FIG. 3B, the upper signal structure is for a short burst transmission and the lower signal structure is for the long burst transmission. Each structure shown in FIG. 3B is defined as one frame.

Each of the signal structures is composed of a synchronization pattern and a data. In the mobile satellite communication system of the present invention, the data transmission from the mobile terminal 3 to the base station apparatus 1 is performed by utilizing a randomly access control system and a reserving system. Thus, two type signals for a short burst transmission and a long burst transmission are transmitted from the mobile terminal 3 to the base station apparatus 1. The super frame is composed of 18 frames and the short burst transmission and the long burst transmission is performed using appropriate frames.

Figure 5A:
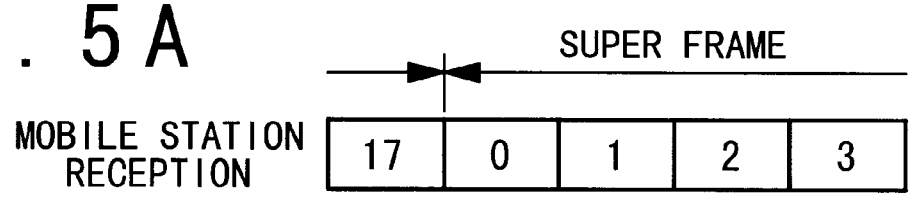
FIGS. 5A and 5B are time charts showing frame receiving timing and frame transmitting timing in the mobile terminal in the embodiment.
Figure 5B:
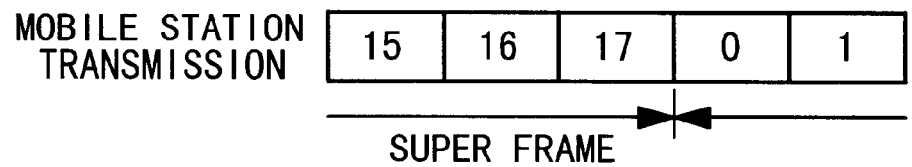

A transmission timing at the head of a frame to be transmitted from the mobile terminal 3 is coincident with a reception timing at the head of a frame received from the base station apparatus 1. As to the super frame counter values of the transmission frame and reception frame, the transmission frame is delayed for two frames from the reception frame in the mobile terminal 3, as shown in FIGS. 5A and 5B.

Figure 1:
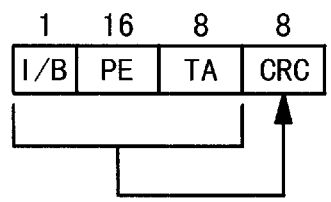
FIG. 1 is a diagram showing the structure of an access control signal transmitted by a base station apparatus in a conventional mobile satellite communication system.
Figure 6:
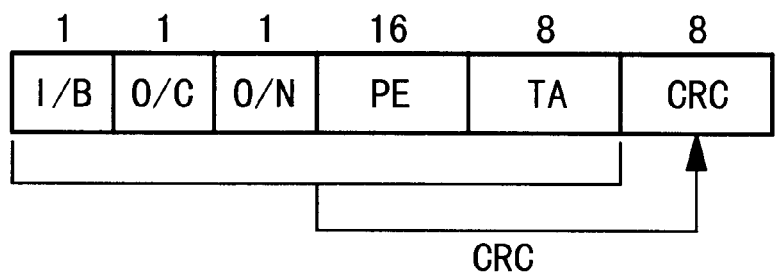
FIG. 6 is a diagram illustrating the structure of an access control signal transmitted from the base station apparatus in the embodiment.

FIG. 6 shows the structure of an access control signal AC transmitted from the base station apparatus 1 through the forward link, in this embodiment. In this embodiment, an O/N bit functioning as correct or incorrect reception indication data and an O/C bit functioning as reservation permission/rejection indication data are added to the above-mentioned structure shown in FIG. 1, in the access control signal AC.

The O/N bit is set to a state of "1" when the short burst transmission from the mobile terminal 3 is correctly received by the base station apparatus 1, and to a state of "0" when it is not correctly received. According to this embodiment, such an O/N bit is transmitted from the base station apparatus 1 through the forward link. Accordingly, when the short burst transmissions from the mobile terminals collide with each other so that the signals cannot be correctly received by the base station apparatus 1, the mobile terminal 3 can quickly know the fact of the incorrect reception.

The O/C bit is set to a state of "1" when the reservation for the long burst transmission from the mobile terminal 3 is permitted, and set to a state of "0" when the reservation is rejected. In this embodiment, the O/C bit is transmitted from the base station apparatus 1 through the forward link. Accordingly, the mobile terminal 3 can quickly determine whether or not the subsequent long burst transmissions can be performed before elapse of a predetermined time after the short burst transmission, when the data which cannot be accommodated in the short burst transmission is to be transmitted. The predetermined time is a time until a timer is set to a time-out state, after the timer started in response to the short burst transmission.

Next, a first operation example in this embodiment will be described below.

Figure 7:
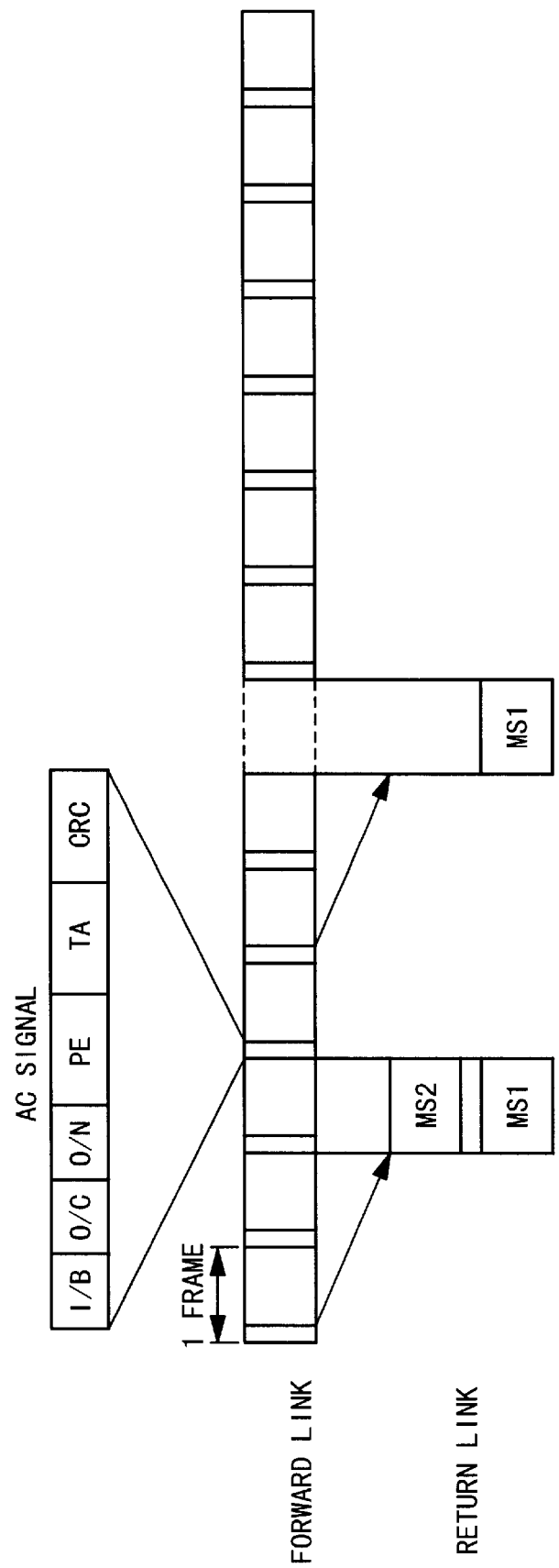
FIG. 7 is a time chart illustrating a first operation example in the embodiment.

FIG. 7 shows an operation example in which two mobile terminals perform only short burst transmissions, and then these short burst transmissions collide with each other. Also, FIG. 8 shows an operation flow of the respective mobile terminals in this case, and FIG. 9 shows an operation flow of the base station apparatus 1.

Figure 8:
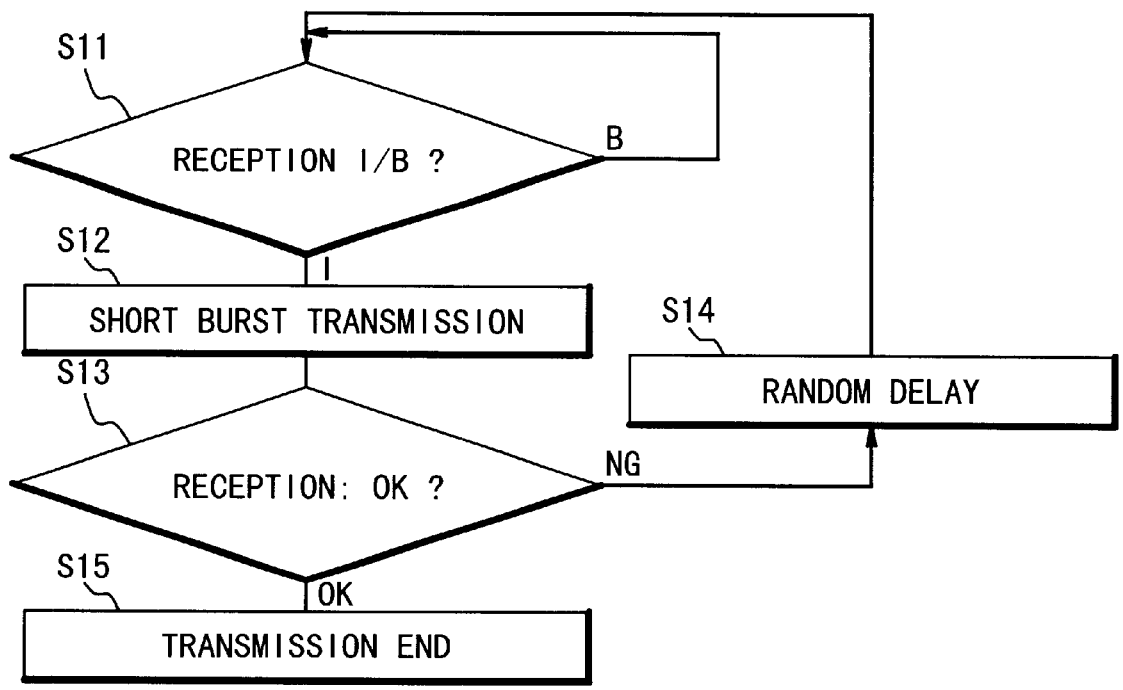
FIG. 8 is a flowchart to explain the first operation example of the mobile terminal in the embodiment.

Each of the mobile terminals always monitors the I/B flag of the access control signal AC received from the base station apparatus 1, as shown in FIG. 8 (Step S11). When recognizing based on the I/B flag that the transmission through the return link is possible, one of the mobile terminals performs a short burst transmission MS1, and the other of the mobile terminals performs a short burst transmission MS2, the two frames after the reception of the access control signal AC (Step S12).

Figure 9:
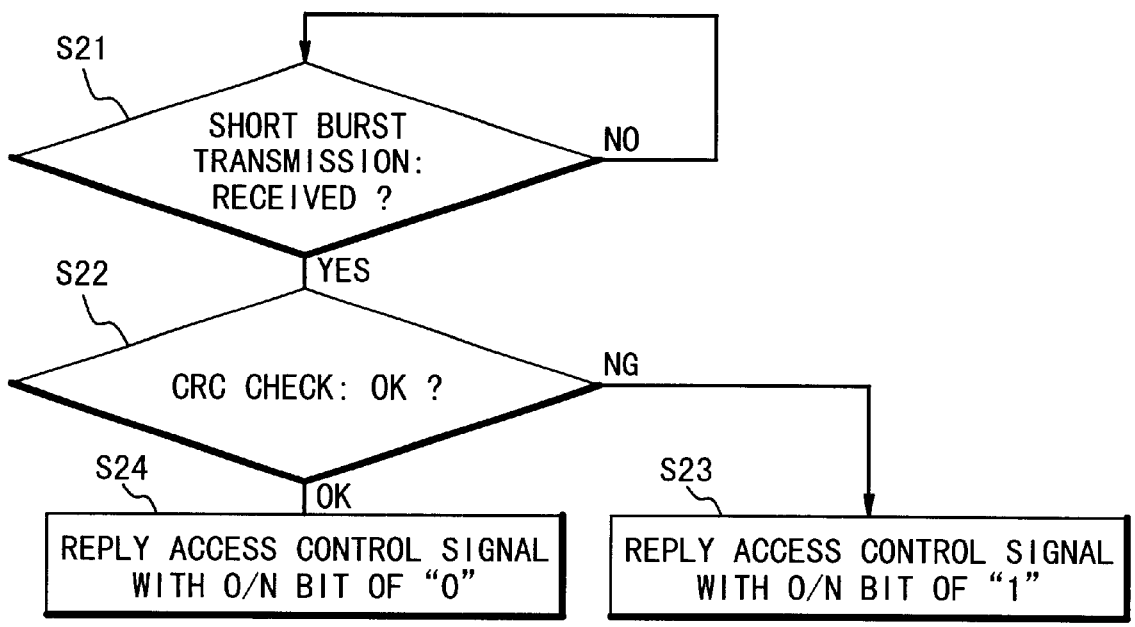
FIG. 9 is a flowchart illustrating the first operation example of the base station apparatus in the embodiment.

On the other hand, as shown in FIG. 9, the base station apparatus 1 always monitors whether or not there is reception of any short burst transmission from the respective mobile terminals, (Step S21). If the short burst transmissions are received by the base station apparatus 1 in a condition that the short burst transmissions MS1 and MS2 from the respective mobile terminals collide with each other, the base station apparatus 1 temporarily determines that there are the receptions of the short burst transmissions. However, after that, errors are detected in a CRC check performed to the short burst transmissions (Step S22). Thus, the base station apparatus 1 determines that any short burst transmission is not received. Therefore, the O/N bit of an access control signal AC is set to "0" and then the access control signal AC is transmitted to the mobile terminals through the forward link (Step S23).

Each mobile terminal receives the access control signal AC transmitted by the base station apparatus 1 two frames after the short burst transmissions MS1 and MS2 (Step S12). The mobile terminal checks the value of the O/N bit of the received access control signal AC, and determines whether or not the short burst transmission transmitted from the mobile terminal is correctly received by the base station apparatus 1 (Step S13). In the case of this operation example, since receiving the access control signal AC including the O/N bit of "0", the mobile terminal determines that the short burst transmission is not correctly received by the base station apparatus 1. Then, after randomly determined delay time (Step S14), the mobile terminal again transmits the short burst transmission (Steps S11 and S12).

As shown in FIG. 7, if only one of the mobile terminals performs the short burst transmission MS1 after the elapse of the above-mentioned delay time, this short burst transmission MS1 is received by the base station apparatus 1 without any collision with another short burst transmission. In this case, any error is not detected in the CRC checking operation carried out by the base station apparatus 1 for the short burst transmission MS1 (Step S22). Thus, the O/N bit of an access control signal AC is set to "1" and the access control signal AC is transmitted to the mobile terminal through the forward link (Step S24).

The mobile terminal which has transmitted the short burst transmission MS1 receives this access control signal AC to thereby know that the short burst transmission is correctly received by the base station apparatus 1. Thus, the transmitting process is ended (Step S15).

A second operation example in this embodiment will be described below.

Figure 10:
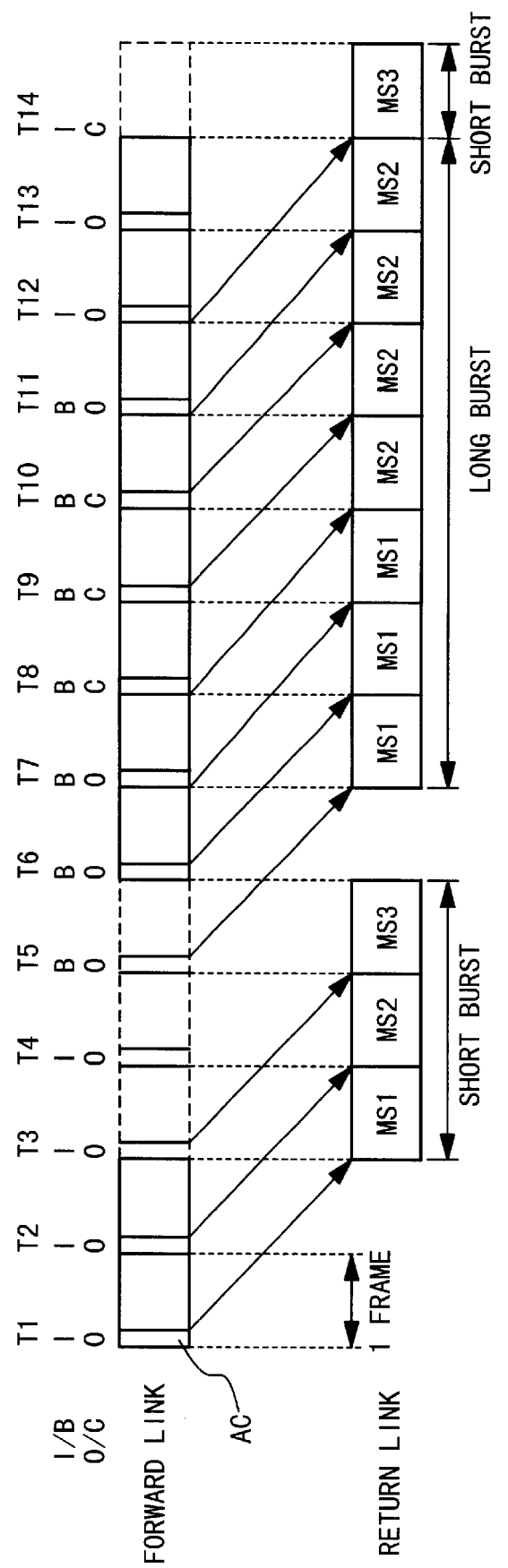
FIG. 10 is a time chart showing a second operation example in the embodiment.
Figure 11:
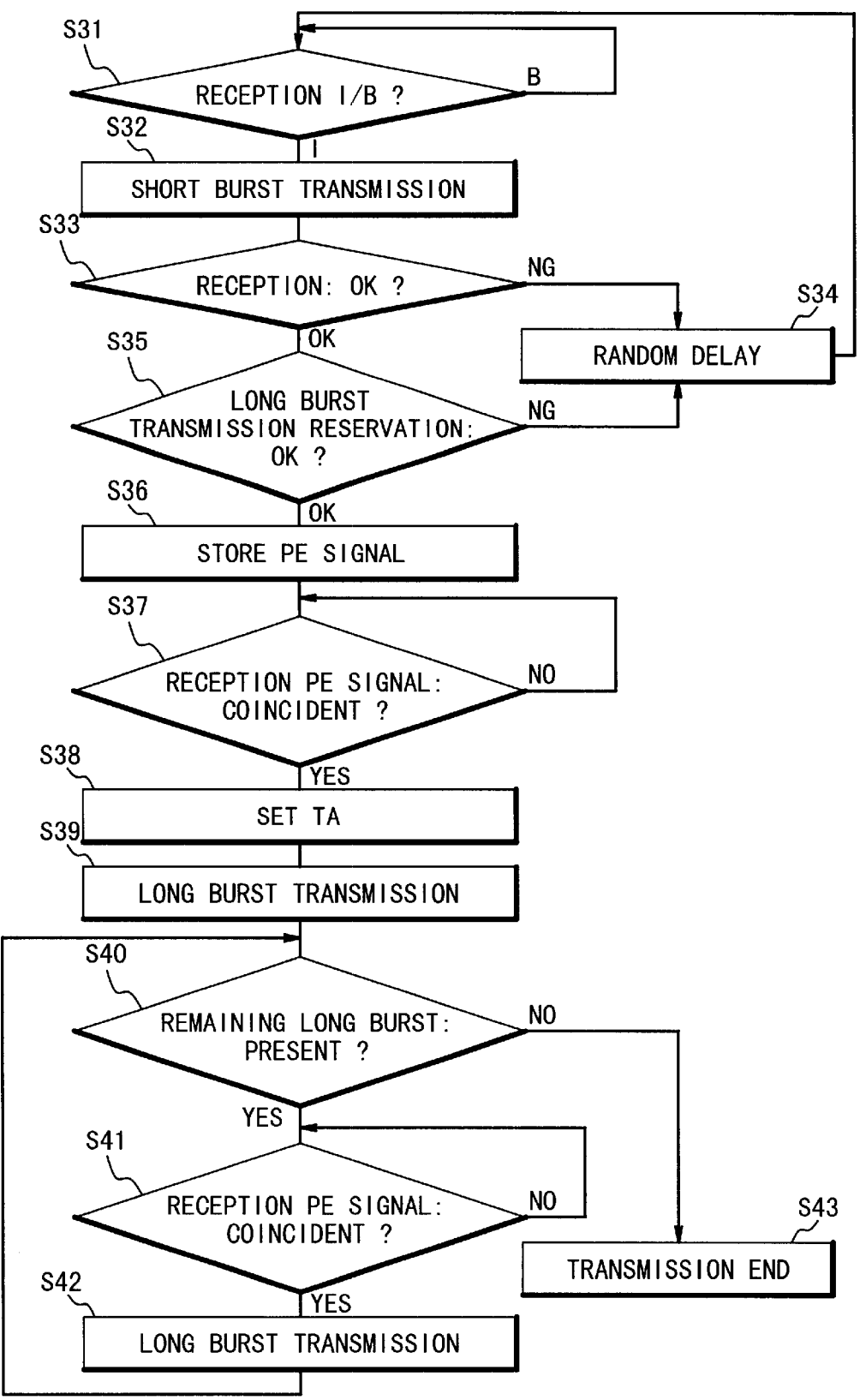
FIG. 11 is a flowchart showing the second operation example of the mobile terminal in the embodiment.
Figure 12:
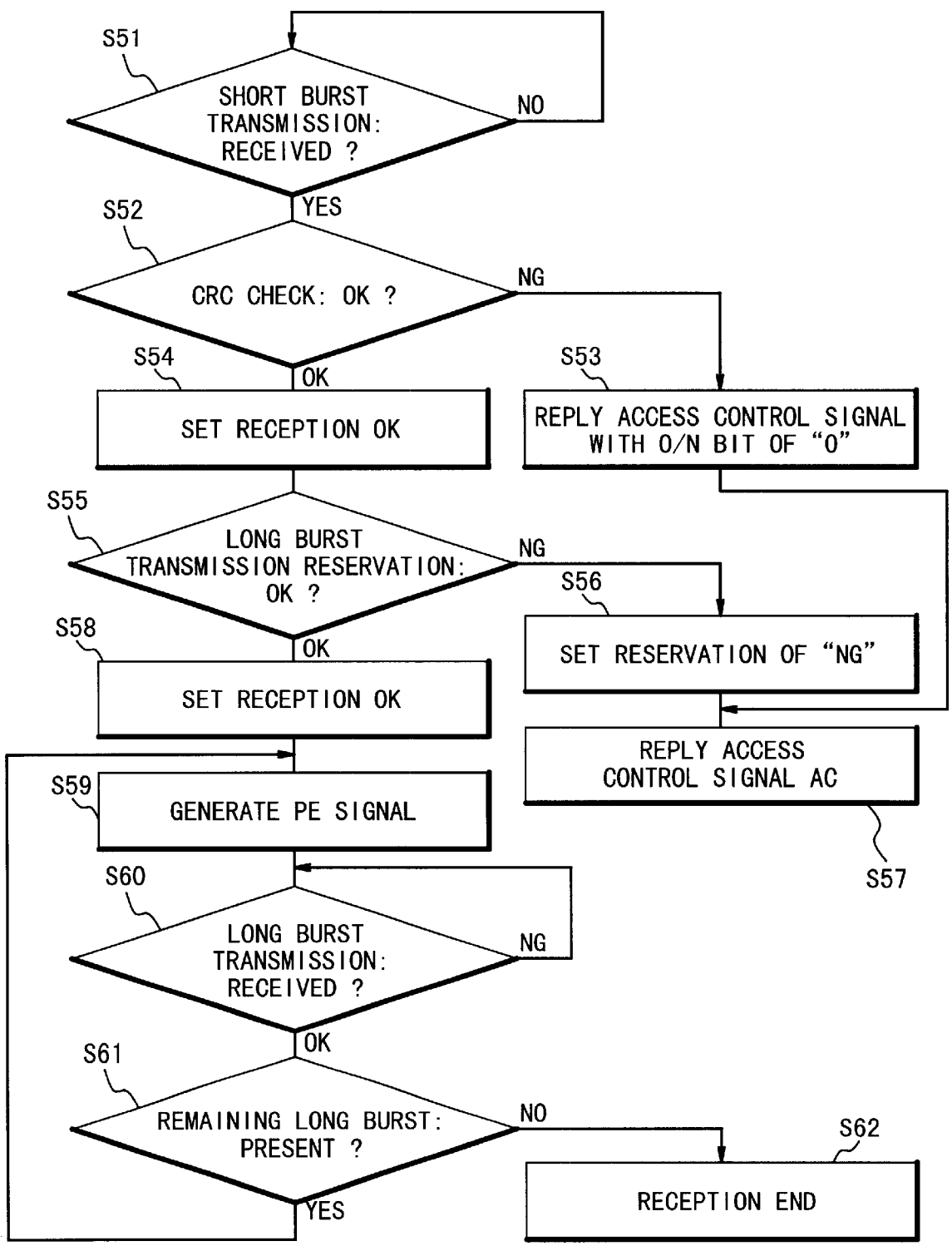
FIG. 12 is a flowchart showing the second operation example of the base station apparatus in the embodiment.

FIG. 10 is a time chart showing an operation example in which three mobile terminals transmit data that cannot be accommodated within the short burst transmission. Also, FIG. 11 shows an operation flow in the respective mobile terminals at this time. FIG. 12 shows an operation flow in the base station apparatus 1. Steps S31 to S34 in FIG. 11 correspond to the steps S11 to S14 in FIG. 8. Steps S51 to S53 in FIG. 12 correspond to the steps S21 to S23 in FIG. 9.

At first, general operations will be described with reference to FIGS. 11 and 12.

As shown in FIG. 11, the mobile terminal always monitors the I/B flag of the access control signal AC received from the base station apparatus 1 (Step S31). Then, when recognizing in accordance with this I/B flag that the transmission through the return link is possible, the mobile terminal transmits a short burst transmission after the two frames (Step S32).

As shown in FIG. 12, the base station apparatus 1 always monitors whether or not there is the reception of the short burst transmission from the mobile terminal (Step S51). If the short burst transmission is received, the base station apparatus 1 carries out the CRC check to the received short burst transmission (Step S52). If an error is detected, the base station apparatus 1 determines that the short burst transmission is not received. The O/N bit of an access control signal AC is set to "0" and then the access control signal AC is transmitted to the mobile terminals through the forward link (Steps S53 and S57).

The mobile terminal receives the access control signal AC transmitted by the base station apparatus 1 two frames after the short burst transmission (Step S32). Then, the mobile terminal investigates the O/N bit of the access control signal AC to determine whether or not the short burst transmission is correctly received by the base station apparatus 1 (Step S33). If the O/N bit of the received access control signal AC is set in the state of "0", the mobile terminal determines that the short burst transmission is not correctly received by the base station apparatus 1. Then, after the randomly determined delay time (Step S34), the mobile terminal again transmits the short burst transmission (Steps S31 and S32). The above-mentioned processes are not different from those described in the first operation example.

It is supposed that any error is not detected in the CRC check, when the short burst transmission is received by the base station apparatus 1. In this case, the base station apparatus 1 set "1" to the O/N bit of an access control signal AC to imply the success of the reception of the short burst transmission (Step S54).

Next, if a data requesting the reservation for a long burst transmission is included within the received short burst transmission, the base station apparatus 1 determines whether or not the reservation for the long burst transmission is permitted (Step S55). When rejecting the reservation, the base station apparatus 1 sets "0" to the O/C bit of the access control signal AC to imply the rejection of the reservation (Step S56). Then, the access control signal AC is transmitted (Step S57). On the contrary, when permitting the reservation, the base station apparatus 1 sets "1" to the O/C bit of the access control signal AC to imply the permission of the reservation (Step S58).

Next, the base station apparatus 1 sets to the access control signal AC, the PE signal including the data specifying the mobile terminal having the permission of the reservation and then transmits to the mobile terminal. Thus, the long burst transmission is required (Step S59).

The mobile terminal investigates the value of the O/C bit of the access control signal AC transmitted by the base station apparatus 1, and determines whether or not the reservation for the long burst transmission required by the short burst transmission is permitted (Step S35). If the received O/C bit is "1", each of the mobile terminals determines whether the PE signal of the access control signal AC is coincident with the data specifying of the mobile terminal (Steps S36 and S37). If it is determined that the PE signal of the access control signal AC designates the mobile terminal, the transmission timing is set in accordance with the time alignment correction value TA of the access control signal AC (Step S38). Then, the long burst is transmitted (Step S39).

When receiving the long burst transmission from the mobile terminal (Step S60), the base station apparatus 1 repeats the transmission of the access control signal including the PE signal designating the mobile terminal and the reception of the long burst transmission from the mobile terminal. Thus, all the long burst transmissions reserved by the mobile terminal are received (Steps S59 to S61). Then, the receiving operation is ended when all the long burst transmissions are received (Step S62).

The mobile terminal performs all the reserved long burst transmissions in response to the above-mentioned operations on the base station apparatus 1 (Steps S40 to S43).

The above-mentioned processes are the general operations in this embodiment.

An actual operation example will be described below with reference to FIG. 10.

For the simple explanation, it is assumed that the number of transmission units (the number of short burst transmissions+the number of long burst transmissions) is four in a first mobile terminal. Also, the number of transmission units is five in a second mobile terminal, and two in a third mobile terminal. Also, the number of long burst transmissions which can be reserved by the base station apparatus 1 is 8.

Also, the following matters are assumed. That is, each mobile terminal starts a timer at the time of the short burst transmission. The mobile terminal determines short burst transmission as a failure, if a PE signal to its mobile terminal is not returned back from the base station apparatus 1, before the timer is set to the time-out state. In this case, the short burst transmission is again tried.

Further, it is assumed that the number of long burst transmissions (=8) which can be reserved by the base station apparatus 1 is smaller than the time-out value of the timer in this mobile terminal.

In the example shown in FIG. 10, the first to third mobile terminals recognize at timings T1, T2 and T3 that the I/B flag of the access control signal AC is set in the "1" state, respectively. Then, the first to third mobile terminals transmit the short burst transmissions MS1, MS2 and MS3 at timings T3, T4 and T5, respectively (Steps S31 and S32).

The respective short burst transmissions MS1, MS2 and MS3 are received by the base station apparatus 1 without any collision with each other (Step S51), and the CRC check is ended without any error (Step S52). Thus, the first mobile terminal recognizes at the timing T5 that the short burst transmission is correctly received, and the reservation for the long burst transmission is permitted. Also, the first mobile terminal recognizes the PE signal assigned to the mobile terminal.

Thereafter, the first mobile terminal performs a long burst transmission at a timing T7, and subsequently, performs the remaining long burst transmissions at timings T8 and T9. Thus, the transmission is ended.

Similarly, the second mobile terminal recognizes at a timing T6 that the short burst transmission is correctly received and further the reservation for the long burst transmission is permitted. Therefore, this mobile terminal recognizes the PE signal to the mobile terminal at the timing 8, and then transmits the long burst transmission from a timing T10. Then, the transmission is ended at a timing T13.

Next, the third mobile terminal recognizes at the timing T7 that although the short burst transmission is correctly received, the reservation for the long burst transmission is rejected. For this reason, the third mobile terminal waits for the reservation for the long burst transmission. Therefore, the third mobile terminal recognizes at a timing T12 that the I/B flag is set in the "1" state and further the reservation is possible, and then performs the short burst transmission from a timing T14. Thus, the transmission is again tried.

In the above-mentioned embodiment, the reservation number of long bursts in the base station apparatus is assumed to be 8, when the data which cannot be accommodated in the short burst transmission is transmitted from the plurality of mobile terminals. However, another value is allowable.

In the above-mentioned embodiment, signals indicative of reception/non-reception of the short burst transmission and the permission/rejection of the reservation for the long burst transmission are included in the structure of the access control signal. However, these signals may be inserted into an information section of the frame structure of the forward link from the base station apparatus to the mobile terminal as shown in FIG. 3.

As described above, according to a mobile satellite communication system of the present invention the effects can be achieved as described below.

(1) A mobile terminal can recognize that short burst transmissions from mobile terminals collide with each other so that the short burst transmission is not received by a base station apparatus, before a timer of the mobile terminal is set to a time-out state. Thus, a retransmission process can be effectively performed.

(2) Conventionally, in this type of mobile satellite communication system, although reservation is possible in the base station apparatus, a timer is set to the time-out state before the return of the PE signal from the base station apparatus, when the data which cannot be accommodated in the short burst transmission is transmitted from a plurality of mobile terminals. Thus, the mobile terminal recognizes the transmission as failure. However, according to the present invention, the mobile terminal can know whether the reservation for the long burst transmission is permitted or the short burst transmission requesting the reservation for the long burst transmission fails, before the timer is set to the time-out state. Therefore, the retransmission can be effectively performed.

What is claimed is:
1. A mobile satellite communication system comprising:
a base station apparatus; and
a plurality of mobile terminals coupled to said base station apparatus through a satellite, wherein there are a forward link from said base station apparatus to said plurality of mobile terminals, and a return link from said plurality of mobile terminals to said base station apparatus,
wherein said base station apparatus transmits an access control signal to one of said plurality of mobile terminals through said forward link,
wherein said one mobile terminal determines whether a correct reception indication data or an incorrect reception indication data is contained in said access control signal, and performs retransmission of said short burst transmission when it is determined that said incorrect reception indication data is contained in said access control signal,
wherein said short burst transmission includes a request data indicating that a data which cannot be transmitted by said short burst transmission is transmitted, and
wherein said one mobile terminal determines whether a reservation permission data is contained in said access control data, and performs a long burst transmission for said data when it is determined that said reservation permission data is contained in said access control data.

2. A mobile satellite communication system according to claim 1, wherein said base station apparatus determines whether said short burst transmission is correctly received, and sets said correct reception indication data in said access control signal when it is determined that said short burst transmission is correctly received, and sets said incorrect reception indication data in said access control signal when it is determined that said short burst transmission is not correctly received.

3. A mobile satellite communication system according to claim 1, wherein said one mobile terminal performs retransmission of said short burst transmission after a delay time when it is determined that said incorrect reception indication data is contained in said access control signal.

4. A mobile satellite communication system according to claim 3, wherein said delay time is randomly determined.

5. A mobile satellite communication system according to claim 1, wherein said one mobile terminal determines whether a mobile terminal for said reservation permission data is said one mobile terminal, when it is determined that said reservation permission data is contained in said access control data, and performs said long burst transmission for said data when it is determined that the mobile terminal for said reservation permission data is said one mobile terminal.

6. A mobile satellite communication system according to claim 1, wherein said base station apparatus determines whether a reservation of a long burst transmission using said return link is to be permitted or rejected, in response to said request data, and sets a reservation permission data in said access control signal when it is determined that the reservation of said long burst transmission using said return link is permitted, and a reservation rejection data in said access control signal when it is determined that the reservation of said long burst transmission using said return link is rejected.

7. A mobile satellite communication system according to claim 6, wherein said one mobile terminal performs retransmission of said short burst transmission when it is determined that said reservation rejection data is contained in said access control signal.

8. A base station apparatus in a mobile satellite communication system in which an access control signal is transmitted from said base station apparatus to a plurality of mobile terminals through a satellite and a forward link from said base station apparatus to said plurality of mobile terminals, comprising:
determining means for determining whether said short burst transmission is correctly received;
setting means for setting said correct reception indication data in said access control signal when it is determined that said short burst transmission is correctly received, and setting said incorrect reception indication data in said access control signal when it is determined that said short burst transmission is not correctly received, wherein said short burst transmission includes a request data indicating that a data which cannot be transmitted by said short burst transmission is transmitted, and wherein said base station apparatus includes:

determining means for determining whether a reservation of a long burst transmission using said return link is to be permitted or rejected, in response to said request data; and setting means for setting a reservation permission data in said access control signal when it is determined that the reservation of said long burst transmission using said return link is permitted, and setting a reservation rejection data in said access control signal when it is determined that the reservation of said long burst transmission using said return link is rejected.

9. A mobile terminal in a satellite communication system in which said mobile terminal is coupled to a base station apparatus through a satellite and a forward link from said base station apparatus to said mobile terminal, and a return link from said mobile terminal to said base station apparatus, comprising:

determining means for determining whether a correct reception indication data or an incorrect reception indication data is contained in said access control signal; and transmission means for performing retransmission of said short burst transmission when it is determined that said incorrect reception indication data is contained in said access control signal, wherein said short burst transmission includes a request data indicating that a data which cannot be transmitted by said short burst transmission is transmitted, and wherein said determining means determines whether a reservation permission data is contained in said access control data, and said transmission means performs a long burst transmission for said data when it is determined that said reservation permission data is contained in said access control data.

10. A mobile terminal according to claim 9, wherein said transmission means performs retransmission of said short burst transmission after a delay time when it is determined that said incorrect reception indication data is contained in said access control signal.

11. A mobile terminal according to claim 10, wherein said delay time is randomly determined.

12. A mobile terminal according to claim 9, wherein said determining means determines whether a mobile terminal for said reservation permission data is said one mobile terminal, when it is determined that said reservation permission data is contained in said access control data, and said transmission means perform said long burst transmission for said data when it is determined that the mobile terminal for said reservation permission data is said one mobile terminal.

13. A mobile terminal according to claim 9, wherein said transmission means performs retransmission of said short burst transmission when it is determined that said reservation rejection data is contained in said access control signal.

14. A method of communicating between a base station apparatus and a plurality of mobile terminals in a mobile satellite communication system, comprising the steps of:

transmitting an access control signal to one of said plurality of mobile terminals through a forward link;

determining whether a correct reception indication data or an incorrect reception indication data is contained in said access control signal; and performing retransmission of said short burst transmission when it is determined that said incorrect reception indication data is contained in said access control signal, wherein said short burst transmission includes a request data indicating that a data which cannot be transmitted by said short burst transmission is transmitted, and wherein said determining step includes determining whether a reservation permission data is contained in said access control data, and said performing step includes performing a long burst transmission for said data when it is determined that said reservation permission data is contained in said access control data.

15. A method according to claim 14, wherein said transmitting step includes:

determining whether said short burst transmission is correctly received; and setting said correct reception indication data in said access control signal when it is determined that said short burst transmission is correctly received, and setting said incorrect reception indication data in said access control signal when it is determined that said short burst transmission is not correctly received.

16. A method according to claim 14, wherein said performing step includes performing retransmission of said short burst transmission after a delay time when it is determined that said incorrect reception indication data is contained in said access control signal.

17. A method according to claim 16, wherein said delay time is randomly determined.

18. A method according to claim 14, wherein said determining step includes determining whether a mobile terminal for said reservation permission data is said one mobile terminal, when it is determined that said reservation permission data is contained in said access control data, and said performing step includes performing said long burst transmission for said data when it is determined that the mobile terminal for said reservation permission data is said one mobile terminal.

19. A method according to claim 14, wherein said transmitting step includes:

determining whether a reservation of a long burst transmission using said return link is to be permitted or rejected, in response to said request data; and setting a reservation permission data in said access control signal when it is determined that the reservation of said long burst transmission using said return link is permitted, and setting a reservation rejection data in said access control signal when it is determined that the reservation of said long burst transmission using said return link is rejected.

20. A method according to claim 19, wherein said performing step includes performing retransmission of said short burst transmission when it is determined that said reservation rejection data is contained in said access control signal.

* * * * *